United States Patent [19]

Hafner

[11] 3,903,517

[45] Sept. 2, 1975

[54] DUAL DENSITY DISPLAY

[75] Inventor: Raymond A. Hafner, Mount Prospect, Ill.

[73] Assignee: Cummins-Allison Corporation, Glenview, Ill.

[22] Filed: Feb. 26, 1974

[21] Appl. No.: 445,964

[52] U.S. Cl. .. 340/324 AD; 178/7.5 D; 178/7.5 SE; 315/367; 340/146.3 ED

[51] Int. Cl.$^{2}$ .......... G06F 3/14

[58] Field of Search .......... 340/324 AD, 146.3 ED; 315/22, 26; 178/7.5 D, 7.5 SE

[56] References Cited

UNITED STATES PATENTS

| | | | |
|---|---|---|---|
| 3,271,738 | 9/1966 | Kamentsky | 340/146.3 ED |
| 3,387,084 | 6/1968 | Hinc et al. | 340/324 AD |
| 3,439,986 | 4/1969 | Moore | 340/146.3 ED |
| 3,471,743 | 10/1969 | Olsson et al. | 340/324 AD |
| 3,624,632 | 11/1971 | Opair | 340/324 A |
| 3,786,481 | 1/1974 | Hartman | 340/324 AD |
| 3,792,613 | 2/1974 | Couture | 340/324 AD |
| 3,812,285 | 5/1974 | Miyata et al. | 340/324 AD |

*Primary Examiner*—David L. Trafton

*Attorney, Agent, or Firm*—Wolfe, Hubbard, Leydig, Voit & Osann, Ltd.

[57] ABSTRACT

A display system using a CRT and capable of simultaneously displaying both a true video picture and matrix characters produced by a character generator. Such display is economically achieved by processing the matrix and video display signals in ways most compatible with each. A code responsive matrix display section includes a code word storage memory for storing the code words corresponding to the characters to be displayed, and a character generator responsive to the code words for producing the dot patterns of the matrix characters. A video display section responds to a digital signal which contains the actual video information for producing the dot pattern of the video picture. The CRT vertical and horizontal sweep rates are dynamically variable. A first rate, utilized with the matrix display section, produces individual dots which are sufficiently separated to generate readable matrix characters. A second rate, operational with the video display section, produces a denser dot pattern, making the individual dots in the video picture relatively imperceptible. In an illustrative application, the display system is adapted for use in a CRT key entry terminal for a re-entry document optical scanning system.

13 Claims, 4 Drawing Figures

PATENTED SEP 2 1975 3,903,517

SHEET 1 OF 3

DUAL DENSITY DISPLAY

This invention relates generally to display systems, and more particularly to those systems utilizing a CRT adapted to display information represented by digital signals.

The prior art, which includes various forms of such display, may be broadly divided into true video or digitally responsive displays and matrix or code responsive displays.

A video responsive display may be defined as one responsive to a digital signal in which each dot position of the display is represented by a digital bit, with the logic level of each bit indicating whether the corresponding dot should be blanked or unblanked. Thus, in a digitally responsive system, the CRT screen is divided into individual dot positions, each of such positions requiring a bit of digital storage to control the blanked or unblanked condition thereof. The resulting storage capacity and the system complexity make true video displays relatively expensive.

By way of contrast, a code responsive system may be described as one wherein the digital input signal does not directly control the dot condition; in such a system the digital signal is in the form of a code which is operative to control the blanked or unblanked condition of a number of dots. Thus, in a code responsive system of the matrix display type, the CRT screen is divided into a number of character positions, each of such positions including a pattern of dots arranged in a matrix. If a five by seven matrix is used, each character position includes 35 dots. Similarly, use of a seven by nine matrix requires 63 dots within each character position. Each character is formed by blanking preselected dots within such matrix in response to a code corresponding to the selected character. As a code for a complete alpha numeric character set may be constructed from only six digital bits, it is easily appreciated that the storage requirement for such a system is considerably less than that required by a video system. For example, a one-quarter by one-quarter inch character, which may require 600 bits of storage in a true video system, may be represented in a matrix system by a code word having only six digital bits. However, it should be appreciated that such matrix display systems are incapable of producing a true video picture, as the only characters which such a system may produce are those contained within the set of the character generator.

In certain instances, it has proven desirable to incorporate a true video capability into a matrix display, for example in systems designed to display alpha numeric data, with an occasional requirement for video display. While prior art video display systems have been capable of filling this need by producing both the alpha numeric and video displays in a video manner, the cost and complexity of such systems have limited their utilization. Other prior art systems have attempted to fill this need in an economical manner by adding graphic capabilities to a matrix display. For example, certain systems have utilized various assemblages of standard matrix characters to produce a graphic representation. Other systems have included a second, graphic character generator operable much as an alpha numeric character generator, but storing dot patterns utilized in producing graphic displays. While these systems achieve a certain graphic effect, it is noted that they are incapable of producing a true video picture, but produce an assemblage of pre-stored patterns in response to the receipt of associated codes. In addition, as the dot density used with matrix displays is relatively coarse, in order to provide readable matrix characters with a minimum number of dots, the graphic representations thus produced are somewhat discontinuous.

With the foregoing in mind, it is a general object of the present invention to provide a CRT display system which has a different operating mode than systems heretofore known, in which the CRT may economically display both matrix character and a true video picture. More specifically, it is an object to provide a CRT display having the economical and operational advantages of a matrix system with the display flexibility of a true video system.

It is a more detailed object to provide a CRT display system which operates in a code responsive manner to minimize display storage, but which includes a digitally responsive video capability.

It is a further object of the invention to provide a dual density display wherein alpha numeric characters are formed from a patterned matrix of dots, in which the dot density is optimized for the element spacing in the matrix, and capable of displaying a video picture and increasing the dot density to make such video picture intelligible. Thus, it is a general aim to provide an economical alpha numerical display with true video capabilities.

Other objects and advantages will become apparent from the following detailed description when taken in conjunction with the accompanying drawings in which.

While the invention will be described in connection with a preferred embodiment, it will be understood that there is no intent to limit it to that embodiment. On the contrary, the intent is to cover all alternatives, modifications and equivalents as may be included within the spirit and scope of the invention as defined by the appended claims.

Figure 1:
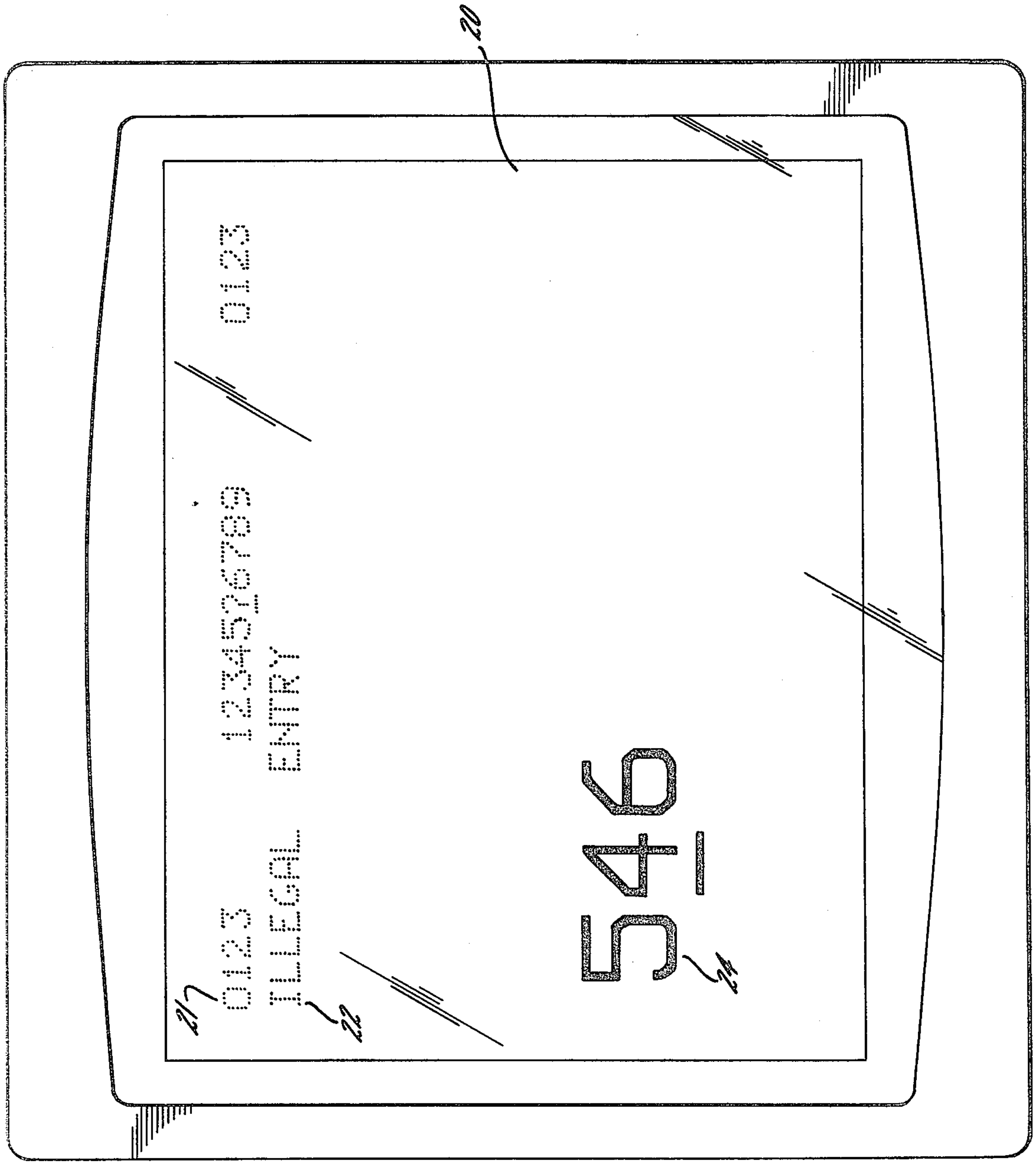
FIG. 1 is a representation of a CRT tube face illustrating display of both matrix characters and a true video picture.

Turning now to the drawings and particularly to FIG. 1, there is seen a representation of a CRT tube face 20 illustrating a display in accordance with the present invention, including two lines of alpha numeric characters 21, 22 and a video insert portion 24. Each of the alpha numeric characters in lines 21 and 22 is formed of a five by seven matrix of dots. It will become apparent, however, that other matrix forms of representation may also be used. In addition, while the basic character set illustrated is comprised mainly of numbers and letters, it is realized that the character set may be altered to include any characters which may be formed using the dot matrix.

Lines 21 and 22 of the display, while not illustrating a complete character set, serve to illustrate the concept involved. Each character position includes an array of 35 dots, being seven dots high and five dots wide. In addition, spaces may be provided between characters and between lines. A particular character is formed by unblanking preselected dots in the matrix. For example, the character "L" in line 22 is formed by unblanking each of the dots in the first vertical column and each of the dots in the lowermost horizontal row. It should also be appreciated that, if it is desired to display a darkened character on a light background, the selected dots may be blanked while all other dots remain unblanked. As is illustrated by the display, the individual dots must be sufficiently separated in order to produce a matrix character of readable size. In practicing the invention, I prefer to utilize a dot density of approximately 28 dots per inch in order to produce matrix characters which are approximately one-quarter inch high.

A portion of a video display is generally indicated at 24. The most obvious difference between this display and the matrix display considered above is the increased character size and the closer spacing of the dots, yielding a continuous image in which the individual dots are relatively imperceptible. In one particular application of my invention, I prefer to utilize a dot density ranging between forty and sixty dots per inch. However, it will become obvious that, utilizing the teachings of my invention, a dot density may be selected for a particular application ranging to the maximum capabilities of the CRT.

Before describing the circuitry capable of producing the aforementioned displays, one difference between the two displays, which is not apparent from their representation in FIG. 1, should be emphasized. The characters represented by lines 21 and 22 are formed in response to a coded signal. As a result, the form or shape of each displayed character is the patterned matrix of dots which resides in an internal character generator. Even if such characters are produced in response to the scanning of a document, the displayed characters are merely indicative of the characters scanned, and are not pictures thereof. By way of contrast, the video picture represented by 24 may be a true reproduction of a character or symbol which is scanned, if such information is contained within the digital signal.

Figures 2, 3:
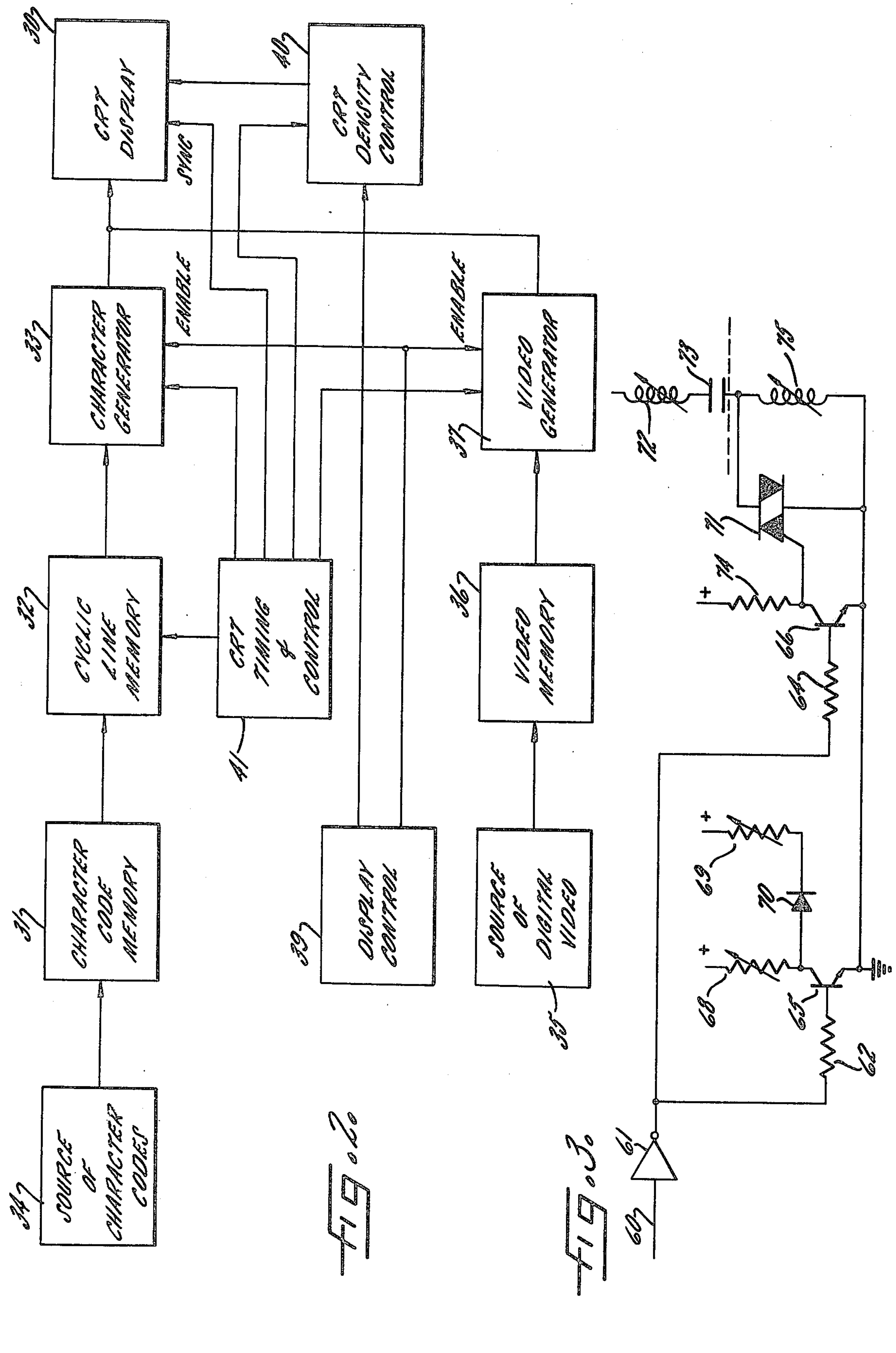
FIG. 2 is a block diagram of the dual density display system.
FIG. 3 is a circuit diagram illustrating means for dynamically altering the dot density.

In accordance with one aspect of the invention, the CRT display as represented by FIG. 1, is controlled by circuitry which is capable of simultaneously producing both matrix characters and a video picture on the same CRT, and in addition, producing such displays at dot densities compatible with each. Referring to FIG. 2, such circuitry is illustrated in block diagram form. As the particular circuitry required to implement many of the blocks is well known to those skilled in the art, such circuitry will be described in functional terms.

The CRT display 30 includes both the CRT tube itself and the various known circuitry for producing a picture thereon, such as an electron beam arranged to strike the tube face, and means for deflecting the beam to sweep in successive spaced lines across the tube face. The normal CRT deflection circuits include a horizontal sweep circuit which rapidly sweeps the tube face in a horizontal direction, and a vertical sweep circuit, which operates at a slower rate to deflect successive horizontal lines in a vertical direction to produce a raster pattern. It should be appreciated that the vertical and horizontal deflection systems may be interchanged without departing from the scope of the invention. Also included within the CRT display 30 is means for selectively blanking the electron beam, such means being responsive to a digital signal. In a known manner, a display is produced on the face of the CRT by sweeping the electron beam across the face thereof and selectively blanking and unblanking the beam in synchronism with the sweep, to produce an image, one horizontal line at a time.

In practicing the invention, the means for blanking the electron beam is made selectively responsive to either a matrix display section or a video display section. The matrix display section is responsive to a source of character codes 34, and includes a character code memory 31, a cyclic line memory 32 and a character generator 33. The video display section is made responsive to a source of digital video data 35 and includes a video memory 36 and a video generator 37. A display control 39 is provided which, acting through the character generator 33 and the video generator 37, selectively enables the matrix display section and the video display section, thereby controlling the form of the display produced on the CRT face. In addition, the display control 39 is coupled to a CRT density control 40, which acts upon the vertical and horizontal deflection circuits to control the spacing between individual dots, or in other words the dot density. As will become more apparent, in a preferred embodiment, the CRT density control 40 serves to produce a first, relatively coarse dot density during periods when the matrix display is enabled, and to produce a second relatively fine dot density when the video display section is enabled. However, it should be realized that, utilizing the teachings of my invention, the density control 40 may be adapted to produce more than two dot densities. For synchronizing the various operations of the circuitry, a CRT timing and control module 41 is provided. This is a known circuit element which includes an oscillator and a number of frequency dividers, arranged to synchronize the operation of the various circuit elements to produce an intelligible display.

The matrix display section is adapted to produce the characters corresponding to the code words provided by the source 34. Such source, which may take various forms known to the art, may be responsive to both internal and external stimulus. For example, the character codes may be generated in response to the scanning of a document and the recognition of the characters scanned. Other forms of external stimulus may be an external keyboard or a computer. In addition, the source 34 may be adapted to internally generate messages for display, such as operator prompting information. Suffice it to say that the source 34 is capable of providing code words which are compatible with the character generator 33, and of loading such code words into their proper location in the character code memory 31.

The character code memory 31 is provided with a memory location for each character position on the CRT face. If a particular character is to be displayed at a given location on the CRT face, the code word of that particular character is stored in a corresponding memory location in the character code memory 31. Thus, the character code memory 31 may be considered a digital representation of the CRT tube face. The source 34 may be coupled to the memory 31 in such a way that one or more lines of the display may be updated without affecting other lines, or that one or more characters within a line may be updated without disturbing the remainder of the line.

The cyclic line memory 32 is adapted to receive from memory 31 the code words corresponding to one line of characters for display, and to couple such code words in sequence, to the character generator 33. Transfer between the character code memory 31 and the cyclic line memory 32 is preferably accomplished in parallel fashion, one word at a time, for purposes of speed. When transfer is complete, the code words are arranged in the cyclic line memory 32 in the order in which the associated characters are to be displayed.

To store data representative of the patterned matrix of dots for forming each of the characters of the character set, a character generator 33 is provided, shown herein as a read-only-memory. When addressed by a digital code word corresponding to one of the characters, the character generator serves to produce a digital signal having logic levels representative of the blanked or unblanked condition of each dot in the matrix for forming the associated character.

The cyclic line memory 32 is arranged as a recirculating shift register to provide the code words stored therein to the character generator 33 in a recurring sequence timed with successive horizontal sweeps of the electron beam. This results in the production of the dot pattern of each horizontal level of the matrix in sequence, in a manner which will become apparent with reference to the following description of an operating cycle.

Display control 39 causes the system to operate in the matrix mode by producing a signal which is coupled to the character generator 33 and the video generator 37, the signal serving to enable the character generator and disable the video generator. In addition, display control 39 provides a signal to CRT density control 40 which adjusts the horizontal and vertical deflection circuits to produce a relatively coarse dot pattern. As described above, the coarse dot pattern is required to make the dot matrix large enough so that any character formed therein is of sufficient size to be readable.

The code words corresponding to the first line of characters to be displayed are transferred from the character code memory 31 to the cyclic line memory 32. Assuming, for example that there are forty character positions within a display line, up to forty code words may be loaded into the cyclic line memory 32 in their proper relative locations. CRT timing and control module 41 provides a clock signal to the cyclic line memory 32 which causes it to shift, imposing the code word corresponding to the first character to be displayed upon the character generator 33. In addition, the timing and control module 41 provides a three digital bit signal to the character generator 33 which causes it to select one of the seven horizontal rows or levels of the matrix, for production of the dots in that row. Initially, the first row is selected. The character generator, in response to a driving signal received from the timing and control module 41, produces a serial digital signal. The logic levels of the first five bits of the signal correspond to the blanked or unblanked condition of the dots in the uppermost row of the first character. After the first row of the first character is thus displayed, the timing and control module 41 causes the cyclic line memory 32 to shift, imposing the code word for the second character on the character generator 33. The driving signal causes the character generator to produce the uppermost row of the second character, at which time the third code word is imposed on the character generator. This operation continues resulting in a serial digital signal containing the information necessary to produce the upper row of the matrix for each character in the first display line.

As the cyclic line memory 32 is arranged as a recirculating shift register, the code word corresponding to the first character to be displayed is reimposed on the character generator after the dot pattern of the last character in the line is produced. At that time, the three bit signal provided to the character generator by the timing and control module selects the second horizontal level in the matrix. In a manner similar to that described above, the second horizontal row of dots is produced. This operation continues until the entire seven rows of the matrix are produced, resulting in the display of the first line of character. At that time, the second line of characters to be displayed is transferred from the character code memory 31 to the cyclic line memory 32 and a similar cycle takes place. This operation continues until the dot pattern of each of the lines of characters is produced, at which time the sequence begins anew starting with the first line, the entire sequence being repeated approximately thirty times every second. If desired, the system timing may be arranged to provide spaces between adjacent characters. In addition, one or more horizontal sweeps may be provided between successive display lines to produce a space between each displayed line of characters.

It should be appreciated that the character code memory 31 includes a location for each character position on the CRT face, the entire CRT face being available for display of such characters. It is only when the display control 39 pre-empts a portion of the CRT tube face for display of a video insert that the entire screen is not available for display of matrix characters. Thus, the CRT display efficiently utilizes the entire CRT tube face until a portion of the face is required for display of a video insert signal.

In accordance with an important aspect of the invention, means are provided for preempting a portion of the CRT tube face, and producing a video insert picture thereon in response to a source of digital data representative of the picture. The source of digital video data 35 may take various forms, the requirement being the generation of a digital signal having logic levels representing the blanked or unblanked condition of the dots necessary to produce the picture. The signal produced by source 35 is coupled to the video memory 36 which is arranged to temporarily store such signal, and to provide successive portions of the signal to the video generator 37 for control of the CRT blanking means. The signal provided by the source 35 is contemplated to be a serial digital pulse train which is loaded into respective memory locations in video memory 36. The video memory arrangement, therefore, is dependent upon the relationship between the digital data and the video picture. More specifically, the video memory will be arranged differently if the serial digital data represents a horizontal row of display, a vertical row of display, or a combination of both. Suffice it to say, that it is well within the skill of the art to load the video memory 36 in such a way that parallel information may be presented to the video generator 37 in such an order that the video picture may be reproduced one scan line at a time.

To preempt a portion of the CRT face for display of a video picture, display control 39 produces a signal which disables the character generator 33 and enables the video generator 37. In addition, the display control 39 provides a signal to the CRT density control 40 to decrease the horizontal and vertical sweep rates such that the dots are "crowded together" both horizontally and vertically. When enabled, the video generator 37 accepts digital information from the video memory 36 in parallel fashion and serializes that data for control of the blanking means within the CRT display 30. The video generator 37 receives a driving signal from the CRT timing and control module 41 which determines the rate at which the serial data is transmitted. It is contemplated that the bit rate for both the character generator 33 and the video generator 37 will be identical; however, in certain instances, it may be desirable to further alter the dot density by altering the frequency of the driving signal. The video memory 36 provides parallel words to the video generator 37 in such an order that, when the video generator serializes the words and provides them to the blanking means in the CRT display 30, the sweeping electron beam generates the dot pattern of the video picture as it sweeps successive lines of the tube face.

In practicing the invention, the display control 39 may selectively enable the character generator 33 and the video generator 37 during respective portions of a single scan of the tube face. In other words, matrix characters may be produced on one area of the tube face and a video picture produced on a second area of the same tube face. As described above, display control 39 may also enable the character generator 33 for a complete scan of the tube face thereby eliminating the video picture. While the video picture may not cover the entire tube face, the matrix display may be blanked, if desired, while a video picture is being displayed. The display control 39 may also be arranged to enable the video generator for operation in synchronism with the vertical sweep, such that a video insert to be displayed may be restricted to a preselected segment of the CRT tube face, or may be produced as a segment whose position on the CRT tube face is variable.

In accordance with the invention, to produce a dual density display, means are provided for altering both the vertical and horizontal sweep rates to control the spacing, both vertically and horizontally, between adjacent dots on the CRT face. The CRT density control 40, which provides this function, may be implemented by the circuitry illustrated in FIG. 3. The dot density produced during any portion of a scan is determined by the digital level present on input line 60, the line which is driven by display control 39 of FIG. 2. When line 60 is at a high level, the deflection circuits are arranged to produce a dot density corresponding to the matrix display. When line 60 is driven to a low level, the deflection circuits are altered to produce a dot density corresponding to the video insert display.

Inverter 61, which buffers the input signal, has its output connected, via current limiting resistors 62, 64, to the bases of transistors 65, 66, arranged as common emitter switches. The load circuit of transistor 65 includes a supplemental height control, shown herein as potentiometer 68, in parallel with potentiometer 69, and a diode 70. Potentiometer 69 represents the existing height control provided in the vertical deflection circuitry of CRT display 30. The normal CRT deflection circuit is in the form of a relaxation oscillator, having a capacitor coupled between the lower terminal of the existing height control 69 and circuit common. Thus, the capacitor is charged through the height control 69, with the charge rate determining the vertical deflection rate.

When line 60 is driven to a low level, inverter 61 causes transistor 65 to saturate, driving its collector to a low level, reverse biasing diode 70 and thus removing supplemental height control 68 from the vertical deflection circuit. This condition provides a first, relatively slow vertical sweep rate which produces a relatively dense raster pattern compatible with the video display. When it is desired to dynamically switch the vertical deflection rate to a second rate compatible with the matrix display, display control 39 drives line 60 high causing inverter 61 to switch transistor 65 off. This allows a second path for charging the vertical deflection circuit capacitor, through supplemental height control 68 and diode 70. The two height control resistors are effectively in parallel thereby decreasing the total resistance and increasing the charging rate, making the vertical sweep rate faster and providing greater space between scan lines to effectively decrease the dot density.

The horizontal sweep rate is controlled in response to inverter 61 by transistor 66. It is seen that the load circuit of transistor 66 includes the gate of a triac 71. The normal horizontal deflection circuit, which is an element of CRT display 30, includes an adjustable inductor 72 and capacitor 73, arranged to deflect the electron beam in a horizontal direction at a rate determined by the values of inductance and capacitance. When line 60 is driven to a high level by display control 39, inverter 61 causes transistor 66 to be cut off, allowing current flow through resistor 74 into the gate of triac 71. This current flow causes triac 71 to conduct, effectively removing a supplemental width control inductor 75 from the deflection circuit, allowing the existing deflection circuit to produce a relatively fast sweep rate compatible with the matrix display. When it is desired to dynamically switch the sweep rate to a second rate compatible with video display, display control 39 drives line 60 low, causing transistor 66 to saturate, removing the gate signal from triac 71. Triac 71 ceases conduction thereby inserting supplemental width control inductor 75 into the deflection circuit. The additional inductance in the horizontal deflection circuit serves to reduce the sweep rate thereby causing the dots produced by the blanking means in response to the serial digital signal to fall closer together on the CRT tube face.

In summary, when line 60 is driven to a high level, both transistors 65 and 66 are turned off. This causes the vertical and horizontal deflection circuit to operate at a relatively fast rate producing a coarse dot density compatible with the matrix display. However, when display control 39 drives line 60 to a low level, transistors 65 and 66 are switched on, slowing down both the horizontal and vertical sweep rates such that the dots fall closer together on the screen. It should be appreciated that the switching between sweep rates may be accomplished at any time, and not only at the initiation of a vertical sweep; the term dynamic switching is used herein to encompass this concept.

Figure 4:
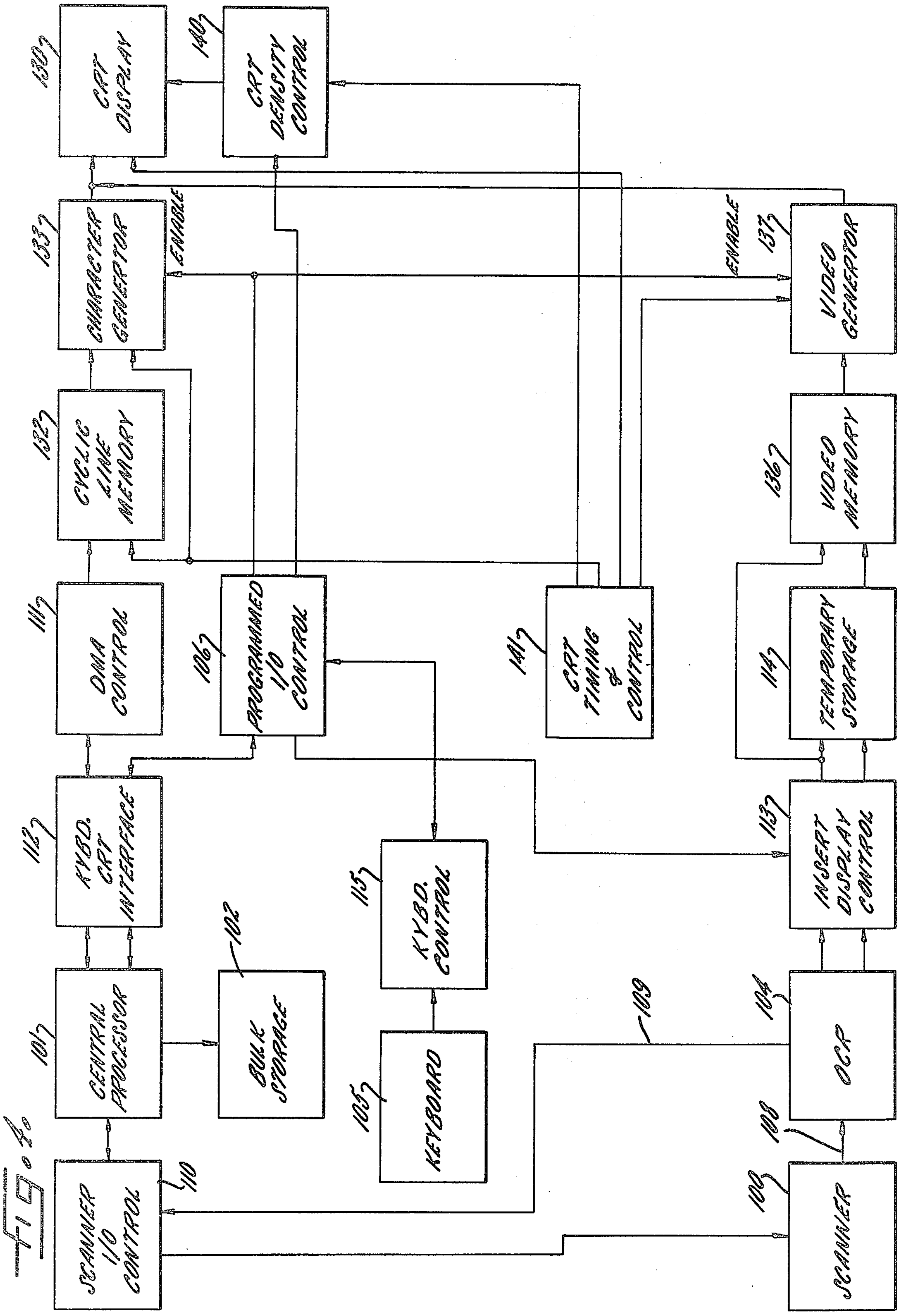
FIG. 4 is a block diagram illustrating the application of the dual density display to a CRT key entry terminal for a re-entry document optical scanning system.

One exemplary application of the dual density display is illustrated in FIG. 4, which shows the block diagram for a CRT key entry terminal for a re-entry document optical scanning system. Such a system may be applied, for example, in a bank for the automatic processing of checks or the like. It is the objective of a scanning system in this application to automatically "read" the coded characters which appear on the lower portion of a check, in conjunction with supplemental characters indicating the amount which may be added prior to scanning, and to enter such information into a computer controlled accounting system. The dual density display is ideally suited to such a system in that it provides remote operator assistance in identifying characters which are unrecognizable to the scanning system. In such an application, the dual density display may display, in matrix form, the entire line read by the scanner, while the video insert section may display the actual video picture of the character which the system was incapable of recognizing. An operator may then view the display, recognize the character by its video image, and, acting through a keyboard, enter the character in question into the system.

Referring again to the drawings, it is seen that many of the elements of the dual density display of FIG. 2 are included in the block diagram of FIG. 4, similar elements being identified by reference numerals which are exactly 100 higher than those of FIG. 2. The CRT display 130 has its blanking means controlled, in one instance by the matrix display section including cyclic line memory 132 and character generator 133, and in the other instance by a video display section including video memory 136 and video generator 137. In a manner similar to that described above, the CRT density control 140 acts upon the vertical and horizontal sweep circuits to control the dot density of the CRT display. Programmed I/0 control 106 performs the function of display control 39 of FIG. 2. However, programmed I/0 control 106 is under the control of a central processor 101, and is a form of interface between the central processor and the remaining circuitry. Like display control 39, programmed I/O 106 selectively enables the character generator 133 and the video generator 137, and in addition controls the CRT density control 140.

Checks are processed at a scanner 100 which may include a document sorter in addition to a light source and an optical scanning head. The scanning head is a photo-diode array which, in one embodiment, is one diode wide and 100 diodes high, arranged to sweep a one inch high band along the bottom of the check. In a known manner the condition of each of the diodes, resulting from the reflection or lack of reflection from the document, is sensed as the diode and document move with respect to each other. The result is a serial digital pulse train whose logic levels represent the video picture of the image presented to the scanner. Stated differently, the scanner breaks the image presented to it down into individual dots and generates a digital signal representative of the light or dark condition of such dots. In my preferred re-entry terminal for use with commercial checks, each scanned character is represented by 2,400 points, being 100 dots high and 24 dots wide. However, as will become apparent, this is for convenience, and to suit the OCR format. Indeed, utilizing a 100 diode array, the scanning may be accomplished in a continuous band 100 dots high with no division between characters.

The serial digital signal produced by the scanner 100 serves a dual purpose in the terminal of FIG. 4. Initially, it is passed to the OCR 104 where it is loaded in a known way into a register and the data pattern compared with the patterns of the characters in the repertoire of the OCR. Stated simply, the OCR accepts the video signal for each character from the scanner and compares that signal to the characters within its repertoire. If the OCR recognizes the character, it produces a digital code corresponding to the character recognized. This code is coupled through scanner I/O control 110 to the central processor 101 and ultimately to a bulk storage unit 102 which may be in the form of a magnetic disc or tape. It should be noted that the information thus recorded is ultimately entered into the major accounting computer for updating the bank's records.

As noted above, when the OCR is incapable of recognizing a character, it becomes important to allow an operator, at some stage of the process, to attempt to recognize that character and enter its code into the bulk storage unit in the proper location. To that end, a small portion of the memory of central processor 101, in my preferred embodiment consisting of 512 words, is dedicated to CRT matrix display storage. Such display storage is directly reachable by DMA control 111 acting upon the central processor 101 through keyboard/CRT interface 112. Thus, a small portion of the central processor memory performs an analogous function to the character code memory 31 of FIG. 2. Each of the character positions on the CRT tube face is provided with a corresponding word within this memory location. The DMA control 111 is provided for efficient transfer of data between the central processor memory and the cyclic line memory 132. As is well known in the art, the DMA control provides direct memory access to locations within the computer memory, herein the matrix storage area, and allows transfer to and from such storage area independently of the central processor I/O system. The direct memory access control 111 takes the code words corresponding to one line of display data from the memory of the central processor 101 and transfers them to the cyclic line memory 132. A display line is produced on the face of the CRT in the manner described with reference to FIG. 2. Similarly after the entire line of matrix characters is produced, the DMA control 111 extracts the next display line from the memory of the central processor 101 and transfers it to cyclic line memory 132. As this operation is under the control of the central processor 101, acting through the programmed I/O control 106, the display may be controlled in accordance with the particular application. For example, in FIG. 1, the information read from the check is displayed on the top line of the CRT, while an operator prompting message is displayed on the second line.

As illustrated in line 21 of FIG. 1, when the OCR is incapable of recognizing a character, the code of a character indicating such inability is generated. In FIG. 1, between the numerals 5 and 6 on line 21 there appears a question mark underscored by a cursor. This indicates to the operator that the OCR was incapable of recognizing the character appearing between the numerals 5 and 6 on the document.

In practicing the invention, the video picture of the unrecognizable character is displayed in the lower portion of the tube face in area 24. As noted above, the video signal derived from the scanner 100 is utilized in two places, the first being described above with respect to the OCR. The serial digital signal is also presented, via the insert display control 113, to temporary storage 114. The temporary storage area, as will become apparent, provides time for decision making, and allows the characters which frame the unidentifiable character to be displayed. The temporary storage area may include three cells of 2400 bits each, thereby being able to store the video data of three characters. These three cells are continually updated with the video signal provided through the OCR 104. Assuming that the OCR is capable of recognizing each character in sequence, data representing newly scanned characters is continually overwritten over the data represented by previously scanned characters. However, when the OCR is incapable of recognizing a character, it provides a signal to the insert display control 113 which causes the data present in temporary storage 114 to be transferred to video memory 136. The timing is arranged in such a manner that three characters are transferred to the video memory 136, the unrecognizable character, and those framing it. The programmed I/O control 106 may then selectively enable the character generator and the video generator for respective portions of each scan of the tube face to produce a display as exemplified in FIG. 1. More specifically, there is seen in line 31 of FIG. 1, an unrecognizable character framed by the numerals 5 and 6. The video display indicated at 24 shows the video picture of the framing numerals 5 and 6 and also the video picture of the unrecognizable character. An operator viewing the screen may immediately recognize the character as the numeral "4" and depress on the keyboard 105 the key corresponding to the numeral 4. This action generates a signal which is coupled through keyboard control 115 and the programmed I/O control 106, to the proper memory location in central processor 101, and ultimately transferred to the bulk storage unit 102.

It is realized that the description of certain portions of the CRT system has been greatly simplified in the interest of brevity and the avoidance of confusion. For example, the blanking of the beam during retrace period has not been described nor has interlaced scanning which is also adaptable to the system. However, it is believed that the novel aspects of my invention have been described with sufficient particularity to enable one skilled in the art to produce a dual density display. Additionally, while not intended to limit the invention in any way, the following information is offered regarding commercially available components which may be used in accordance with the teachings of the specification in constructing a re-entry terminal: CRT - Motorola, Model XM 351 ; Central processor with DMA - General Automation, SPC-16, Model 45; Scanner - Cummins Allison, Model 216; Photodiode array (the sensing element within the scanner) - Redicon, Model RL 256 , and OCR - Input Business Machines Inc., Model OCR-620.

While the invention has been described with reference to a preferred embodiment, it is apparent that numerous modifications may be made without departing from the scope thereof, as defined by the appended claims. For example, data transfer between certain modules has been described as serial or parallel as dictated by a preferred circuit. However, it is apparent it would require no more than mechanical skill to modify the mode of data transfer to suit a particular application. Additionally, the dual density display has been described in conjunction with a re-entry terminal, such terminal serving to illustrate only one of the many applications of the dual density display.

I claim as my invention:

1. In a display system having a CRT, deflection means for causing an electron beam to sweep through successive lines on the face of the CRT, and means for selectively blanking the electron beam in synchronism with the sweep thereof to produce a dot pattern on the face of the CRT, the combination comprising, a code responsive character generator, a digitally responsive video generator, means for selectively enabling the character generator and the video generator for controlling the blanking means, and density control means for varying the deflection rate of said deflection means, said density control means arranged to be operable in conjunction with said enabling means for producing dot patterns of different densities under the control of the character generator and under the control of the video generator.

2. The display system as set forth in claim 1 wherein the deflection means includes horizontal and vertical deflection circuits, the density control means including means for varying deflection rate of both of said circuits.

3. In a matrix display system having a CRT, deflection means for causing an electron beam to sweep through spaced lines on the face of the CRT, means for selectively blanking the beam to produce dots on the face of the CRT, a character generator containing data representative of a plurality of dot patterns, the character generator being coupled to the blanking means for producing dot patterns on the CRT face represented by said contained data, the improvement comprising, means for preempting a portion of the CRT face for displaying a video picture, said preempting means including a digitally responsive video generator for producing the dot pattern of the video picture and density control means for increasing the dot density on the preempted portion of the CRT tube face.

4. In a display system having a CRT, horizontal and vertical deflection circuits for causing an electron beam to sweep through successive spaced lines on the face of the CRT, means for selectively blanking the electron beam in synchronism with the sweep thereof to produce dots on the face of the CRT, a source of digital code words representative of characters selected from a predetermined set for display, each of said characters being formable from a patterned matrix of dots, and a source of digital data representative of a video picture for display, the combination comprising, a character generator containing data representative of the patterned matrix of dots for forming each of the characters of said set, means for operatively coupling the selected code words to the character generator and the character generator to the blanking means so that the electron beam is selectively blanked while sweeping the face of the CRT to produce the dot pattern corresponding to each of the selected code words, a video generator for operatively coupling the digital data representative of the video picture to the blanking means so that the electron beam is selectively blanked while sweeping the face of the CRT to produce the video picture, and means for selectively enabling the character generator and the video generator.

5. The display system as set forth in claim 4, further including means responsive to the enabling of the video generator for dynamically decreasing the deflection rate of said horizontal and vertical deflection circuits whereby the video picture is displayed with a dot pattern which is denser than the matrix dot pattern.

6. The display system as set forth in claim 5 further including first storage means interposed between the source of code words and the character generator for storing the selected code words and coupling said selected code words in sequence to the character generator.

7. The display system as set forth in claim 6 wherein the first storage means includes a recirculating shift register adapted to couple said selected code words to the character generator in a recurring sequence timed with successive sweep lines so that the dot pattern of each level of the matrix is individually produced.

8. The display system as set forth in claim 6 further including second storage means interposed between the source of digital data and the video generator.

9. The display system as set forth in claim 5 wherein the enabling means alternately enables the character generator during a first series of scan lines and the video generator during a second series of scan lines whereby the CRT simultaneously displays the selected characters and the video picture.

10. In a display system having a CRT, deflection means for causing an electron beam to sweep through successive lines on the face of the CRT, means for selectively blanking the electron beam to produce dots on the face of the CRT, a source of digital code words representative of a pattern of dots selected for display from a predetermined set of patterns, and a source of digital data representative of a video picture for display, the combination comprising a character generator containing data representative of each of the dot patterns of said set, means for coupling selected code words to the character generator, means for coupling the character generator to the blanking means so that the electron beam is selectively blanked while sweeping the face of the CRT to produce the dot patterns corresponding to each of the selected code words, a video generator, means for coupling the digital data representative of the video picture to the video generator, means for coupling the video generator to the blanking means so that the electron beam is selectively blanked while sweeping the face of the CRT to produce the video picture, means for selectively enabling the character generator and the video generator, and means responsive to the enabling of the video generator for dynamically decreasing the deflection rate of said deflection means whereby the dot density is increased for display of the video picture.

11. In a display system having a CRT, means for causing an electron beam to sweep through successive spaced lines on the face of the CRT to produce a scan thereof in a raster pattern, means for selectively blanking the electron beam in synchronism with the scan thereof to produce a dot pattern on the face of the CRT, a source of digital code words representative of characters selected from a predetermined set for display, each of said characters being formable from a patterned matrix of dots, a source of digital data representative of the dot pattern of a video picture for display, the combination comprising, a matrix display section, a video display section, and means for selectively enabling said matrix and video display sections, the matrix display section comprising code word storage means coupled to the source of digital code words for storing said selected code words, a character generator containing data representative of the patterned matrix of dots for forming each of the characters of said set, the character generator operatively interposed between the code word storage means and the blanking means to produce the dot patterns of said selected characters on the face of the CRT, means for producing a relatively coarse sweep rate so that the dots in the matrix are spaced to produce matrix characters of readable size on the face of the CRT, the video display section comprising video storage means coupled to the source of digital data for storing said digital data, a video generator operatively interposed between the video storage means and the blanking means to produce the dot pattern of the video picture on the face of the CRT, means for producing a relatively fine sweep rate so that the individual dots in the video picture are relatively imperceptible to produce a continuous video picture, whereby the CRT face may display both matrix characters and a video picture with a dot density compatible with each.

12. The display system as set forth in claim 11 wherein the enabling means selectively enables the video and matrix display sections during respective portions of each scan whereby the CRT displays the matrix characters and the video picture simultaneously.

13. An optical scanning system for use with documents containing characters of a predetermined set, each of said characters having a corresponding code word, comprising in combination, scanning means for optically scanning the characters on the documents and for producing a digital video signal containing the dot pattern of said scanned characters, recognition means for receiving the digital video signal and for producing the code word corresponding to each of the characters recognized in said digital video signal, means coupled to the recognition means for storing said code words, means for producing a first signal in response to the failure of the recognition means to recognize a character in said digital video signal, a CRT display having a character generator responsive to said set of code words, the CRT being adapted to display a representation of said characters formable from a matrix of dots, said first signal causing the display of the matrix representation of the recognized characters on a first portion of the CRT face, means for preempting a second portion of the CRT face in response to said first signal, said preempting means including a video generator, means for coupling said digital video signal to the video generator for producing the dot pattern of the scanned unrecognized character, density control means for increasing the dot density on the preempted portion of the CRT face, and a keyboard located near the CRT and having a key corresponding to each of the characters of said set, each key of the keyboard being adapted to produce the code word corresponding to the associated character in response to the depression thereof and to couple the produced code word to the storage means, whereby the CRT and keyboard allow an operator to enter the code word corresponding to unrecognized characters into the storage means.

* * * * *